(12) United States Patent
Sarwat et al.

(10) Patent No.: US 12,438,397 B1
(45) Date of Patent: Oct. 7, 2025

(54) SYSTEMS AND METHODS FOR DYNAMIC WIRELESS POWER TRANSFER

(71) Applicants: Arif I. Sarwat, Miami, FL (US); Milad Behnamfar, Miami, FL (US)

(72) Inventors: Arif I. Sarwat, Miami, FL (US); Milad Behnamfar, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 19/233,709

(22) Filed: Jun. 10, 2025

(51) Int. Cl.
| | | |
|---|---|---|
| *H02J 50/12* | (2016.01) | |
| *B60L 53/12* | (2019.01) | |
| *H01F 27/28* | (2006.01) | |
| *H02J 50/40* | (2016.01) | |

(52) U.S. Cl.
CPC .............. *H02J 50/12* (2016.02); *B60L 53/12* (2019.02); *H02J 50/402* (2020.01); *H01F 27/28* (2013.01)

(58) Field of Classification Search
CPC ......... H02J 50/12; H02J 50/402; B60L 53/12; H01F 27/28
See application file for complete search history.

(56) References Cited

U.S. PATENT DOCUMENTS

| | | | | |
|---|---|---|---|---|
| 5,311,973 A | * | 5/1994 | Tseng ...................... | H02J 50/70 320/108 |
| 5,573,090 A | * | 11/1996 | Ross ....................... | B60L 5/005 320/109 |
| 9,731,614 B1 | * | 8/2017 | Sarwat ..................... | B60L 53/12 |
| 10,325,717 B2 | * | 6/2019 | Boys ....................... | B60L 5/005 |
| 11,651,891 B2 | * | 5/2023 | Boys ....................... | B60L 53/122 191/10 |
| 11,936,206 B1 | * | 3/2024 | Sarwat ..................... | B60L 53/32 |
| 12,370,912 B1 | * | 7/2025 | Sarwat ................... | B60L 53/126 |
| 2009/0237194 A1 | * | 9/2009 | Waffenschmidt ....... | H02J 50/90 320/108 |
| 2012/0098485 A1 | * | 4/2012 | Kang ...................... | H02J 50/80 320/108 |
| 2012/0217111 A1 | * | 8/2012 | Boys ..................... | B60L 53/126 191/10 |
| 2019/0097471 A1 | * | 3/2019 | Pantic .................... | H02J 50/12 |
| 2021/0151249 A1 | * | 5/2021 | Boys ....................... | B60L 53/12 |
| 2021/0188106 A1 | * | 6/2021 | Asa ..................... | H02M 1/4216 |
| 2022/0337088 A1 | * | 10/2022 | Carter .................. | H02J 50/005 |
| 2022/0416584 A1 | * | 12/2022 | Liu ......................... | H02J 50/10 |
| 2023/0142869 A1 | * | 5/2023 | Deng .................... | H02M 1/007 320/108 |
| 2023/0170740 A1 | * | 6/2023 | Sarwat .................... | H02J 7/02 320/108 |

(Continued)

*Primary Examiner* — Rexford N Barnie
*Assistant Examiner* — Michael J Warmflash
(74) *Attorney, Agent, or Firm* — SALIWANCHIK, LLOYD & EISENSCHENK

(57) ABSTRACT

Systems and methods for dynamic wireless power transfer (DWPT) are provided (e.g., DWPT of electric vehicles (EVs)). The inductor of the secondary compensation network can be integrated with the main inductive coil, which can introduce mutual couplings (e.g., three mutual couplings) in the system. The additional mutual coupling leads to a smooth power profile and an increase in power (e.g., power transferred during dynamic charging). The secondary compensation network inductor coil and the secondary main coil can be designed, configured, and/or arranged in a way that mutual coupling between them and the transmitter coils produces a uniform power profile.

13 Claims, 23 Drawing Sheets

(56) References Cited

U.S. PATENT DOCUMENTS

| | | | |
|---|---|---|---|
| 2023/0208211 A1* | 6/2023 | Jayathurathnage | H02J 50/90 307/104 |
| 2023/0361599 A1* | 11/2023 | Podhola | H02J 50/10 |
| 2024/0100972 A1* | 3/2024 | Wu | H01F 27/366 |
| 2024/0235270 A1* | 7/2024 | Jiang | H02M 1/0043 |

* cited by examiner

TABLE I
TRANSMITTER AND RECEIVER COUPLER DIMENSIONS

| Parameter | Description | value |
|---|---|---|
| $l_{oc}$ | Main coil's outer length | 300mm |
| $w_{oc}$ | Main coil's outer width | 300mm |
| $l_{ic}$ | Main coil's inner length | 75mm |
| $w_{ic}$ | Main coil's inner width | 75mm |
| $l_{ofs}$ | Compensation inductor's outer length | 300mm |
| $w_{ofs}$ | Compensation inductor's outer width | 300mm |
| $l_{ifs}$ | Compensation inductor's inner length | 75mm |
| $w_{ifs}$ | Compensation inductor's inner width | 75mm |
| $d$ | Distance between adjacent transmitter coils | 150mm |
| $D$ | Distance between receiver coil and compensation inductor coil | 375mm |
| $d_{airgap}$ | Airgap | 150mm |

FIG. 15

CIRCUIT PARAMETERS

| Parameter | Description | value |
|---|---|---|
| $V_{in}$ | Input voltage | 25V |
| $L_{p1}, \ldots, L_{pn}$, and $L_s$ | Self-inductance of main transmitter coils and receiver coil | $30\mu H$ |
| $L_{fp1}, \ldots, L_{fpn}$ | Resonant inductors of transmitter side | $5\mu H$ |
| $L_{fs}$ | Resonant inductor of receiver side | $30\mu H$ |
| $C_{fp1}, \ldots, C_{fpn}$ | Parallel resonant capacitors of transmitter side | $700nF$ |
| $C_{fs}$ | resonant capacitor of receiver side | $116nF$ |
| $C_{p1}, \ldots, C_{pn}$ | Series resonant capacitors of transmitter side | $140nF$ |
| $C_s$ | Resonant capacitor of receiver side | $58nF$ |
| $f_s$ | Operating frequency of inverter | $85kHz$ |
| $R_L$ | Resistive load | $25\Omega$ |

FIG. 16

COMPARISON BETWEEN THE PROPOSED COMPENSATION NETWORK TOPOLOGY AND STATE-OF-THE-ART APPROACHES

|  | This work | [24] | [25] | [14] |
| --- | --- | --- | --- | --- |
| Compensation network topology | LCC-CLC | S-LCC/SP | Detuning-repeater-based LC-S-LC | LCC-LCC with passive LC network between transmitter coils |
| Number of compensation network passive components | 5N | 4N | 5N | 7N |
| Number of active coils | N+2 | N+1 | 2N | 2N |
| Control requirement | Not required | Required | Not required | Not required |
| Proposed strategy | Coupling inductor of CLC with transmitter coils | Utilizing control to switch between S-LCC to S-SP and vice versa | Optimization method based on detuning rate | Vector-summing approach |
| Output fluctuation rate during EV motion | $\Delta V$: within 4% | $\Delta V$: 14.3% | $\Delta P$: 8.5% | $\Delta P$: 3.7% |

Note: $N$ is the number of transmitter coils.

FIG. 17

SYSTEMS AND METHODS FOR DYNAMIC WIRELESS POWER TRANSFER

BACKGROUND

Electric vehicles (EVs) are rapidly becoming the preferred alternative to traditional gasoline cars, leading to a significant shift in the automotive industry towards electric powertrains. This transformation is driven by concerns over dwindling fossil fuel resources and the environmental harm caused by conventional fuel vehicles. While there have been notable improvements in EV charging infrastructure, the issue of range anxiety continues to hinder mass adoption. In response, dynamic wireless power transfer (DWPT) offers a promising solution, enabling continuous, real-time charging for EVs on the move. This technology not only alleviates range anxiety but also has the potential to reduce the need for larger, more expensive battery systems.

DWPT systems are categorized into two main types based on the transmitter coil length: the long-track transmitter; and the segmented coil array. The long-track transmitter features an extended track that is much larger than the receiver coils, enabling the simultaneous charging of multiple vehicles over a longer distance. However, this approach faces challenges such as low efficiency and high electromagnetic interference. In contrast, the segmented coil array method addresses many of the long-track transmitter's limitations but introduces the issue of voltage fluctuations as the vehicle passes over different transmitter coils. Managing these voltage fluctuations is critical in DWPT systems, as they can negatively affect battery lifespan and overall system efficiency.

BRIEF SUMMARY

Embodiments of the subject invention provide novel and advantageous systems and methods for dynamic wireless power transfer (DWPT) (e.g., of electric vehicles (EVs)). The inductor of the secondary compensation network can be integrated with the main inductive coil, which can introduce mutual couplings (e.g., three mutual couplings) in the system. The additional mutual coupling leads to a smooth power profile and an increase in power (e.g., power transferred during dynamic charging). The secondary compensation network (e.g., the secondary compensation network inductor coil) and the secondary main coil can be designed, configured, and/or arranged in a way that mutual coupling between them and the transmitter coils produces a uniform power profile.

In an embodiment, a system for DWPT can comprise: a transmitter side configured to wirelessly transmit power to a receiver coil during DWPT, the transmitter side comprising a plurality of transmitter coils; and a receiver side configured to wirelessly receive power from the transmitter side during DWPT, the receiver side comprising the receiver coil. The receiver side can further comprise a secondary compensation network comprising a compensation inductor integrated with the receiver coil and disposed in parallel with the receiver coil. The compensation inductor can have the same outer length as the receiver coil and/or the same inner length as the receiver coil. The system can be configured to produce an output voltage, on the receiver side during DWPT, with a fluctuation rate within a predetermined fluctuation limit (e.g., +/−10% or less, such as +/−7% or less, or +/−4% or less). Each transmitter coil of the plurality of transmitter coils can have the same outer length as the receiver coil and the same inner length as the receiver coil. The compensation inductor can have a same inductance value as the receiver coil, and/or each transmitter coil of the plurality of transmitter coils having the same inductance value as the receiver coil. The compensation inductor can be identical to the receiver coil, and/or each transmitter coil of the plurality of transmitter coils can be identical to the receiver coil. The secondary compensation network can further comprise: a first series resonant capacitor disposed in series with the receiver coil; and a second series resonant capacitor disposed in series with the first series resonant capacitor. The transmitter side can further comprise: a plurality of parallel resonant capacitors disposed in parallel with the plurality of transmitter coils, respectively; and/or a plurality of resonant inductors disposed in series with the plurality of transmitter coils, respectively. The transmitter coils and the receiver coil can have a first mutual inductance during DWPT, and the transmitter coils and the compensation inductor can have a second mutual inductance during DWPT. The system can be configured such that a sum of the first mutual inductance and the second mutual inductance is stable within a predetermined stability limit during DWPT. The receiver side can be disposed on an EV, which may be part of the system.

In another embodiment, a method for DWPT can comprise: providing a system for DWPT as discussed in the previous paragraph (including any or all of the features discussed therein); and moving the receiver side over the transmitter side such that the receiver side receives power from the transmitter side as it moves over the transmitter side. The fluctuation rate of the output voltage, on the receiver side during the DWPT, can be within a predetermined fluctuation limit (e.g., +/−10% or less, such as +/−7% or less, or +/−4% or less). The transmitter coils and the receiver coil can have a first mutual inductance during the DWPT, and the transmitter coils and the compensation inductor can have a second mutual inductance during the DWPT. A sum of the first mutual inductance and the second mutual inductance can be stable within a predetermined stability limit during the DWPT. The moving of the receiver side over the transmitter side can comprise driving the EV over the transmitter side.

In another embodiment, a method (see also FIG. 12) for designing a system for DWPT (as discussed in the paragraph above the previous paragraph, including any or all features discussed therein) can comprise the following steps, which can be performed in order: i) setting the outer length ($l_{oc}$) and the inner length ($l_{ic}$) for the compensation inductor, the receiver coil, and each transmitter coil of the plurality of transmitter coils; ii) setting a first distance (d) between adjacent transmitter coils of the plurality of transmitter coils; iii) setting a second distance (D) between the receiver coil and the compensation inductor; iv) adding a first mutual inductance (M) between the transmitter coils and the receiver coil to a second mutual inductance ($M_f$) between the transmitter coils and the compensation inductor, to obtain a summed mutual inductance ($M+M_f$); v) determining whether the summed mutual inductance is stable within a predetermined stability limit; vi) upon determining that the summed mutual inductance is not stable within the predetermined stability limit, returning to step ii); vii) upon determining that the summed mutual inductance is stable within the predetermined stability limit, determining whether a fluctuation rate of an output voltage of the system, on the receiver side during the DWPT, is within a predetermined fluctuation limit; viii) upon determining that the fluctuation rate of the output voltage is not within the predetermined fluctuation limit, returning to step ii); and ix) upon determining that the fluctuation rate of the output voltage is within the predetermined fluctuation limit, determining that the first distance and the second distance are final values for the system with the set outer length and the set inner length for the compensation inductor, the receiver coil, and each transmitter coil of the plurality of transmitter coils. The predetermined fluctuation limit can be, for example, +/−10% or less, such as +/−7% or less, or +/−4% or less.

BRIEF DESCRIPTION OF DRAWINGS

FIGS. 13A-13E show output voltage for receiver positions of 0 mm, 200 mm, 400 mm, 600 mm, and 800 mm, respectively.

FIG. 15 shows a table of transmitter and receiver coupler dimensions.

FIG. 16 shows a table of circuit parameters.

FIG. 17 shows a table of a comparison of a system according to an embodiment of the subject invention with related art secondary side control schemes. The column labeled "This work" is for a system according to an embodiment of the subject invention; the column labeled "[24]" is for a system from Shanmugam et al. (Receiver side-controlled load-independent s-lcc/sp-compensated multileg inverter-powered dynamic charging system, IEEE 30 Transactions on Industrial Electronics, 2024; which is hereby incorporated by reference herein in its entirety); the column labeled "[25]" is for a system from Xiong et al. (A detuning-repeater-based dynamic wireless charging system with quasi-constant output power and reduced inverter count, IEEE Transactions on Power Electronics, vol. 38, no. 1, pp. 1336-1347, 2022; which is hereby incorporated by reference herein in its entirety); and the column labeled "[14]" is for a system from Deng et al. (A method based on vector-summing of reduce output power fluctuation for ev-dwpt system with the passive lc network, IEEE Transactions on Transportation Electrification, 2024; which is hereby incorporated by reference herein in its entirety).

DETAILED DESCRIPTION

Figure 1:
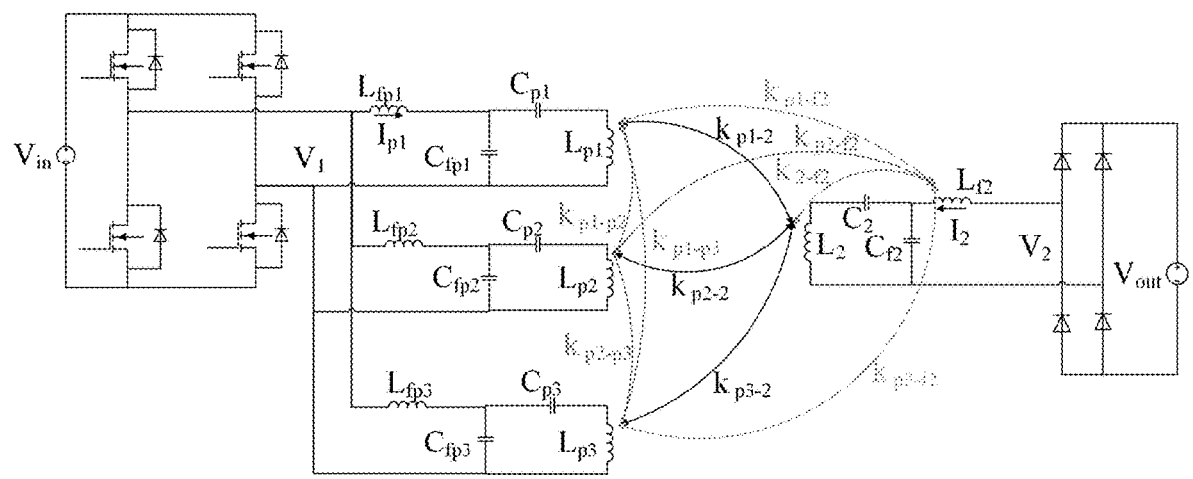
FIG. 1 shows a circuit topology of a dynamic wireless power transfer (DWPT) system, according to an embodiment of the subject invention.

Embodiments of the subject invention provide novel and advantageous systems and methods for dynamic wireless power transfer (DWPT) (e.g., of electric vehicles (EVs)). The inductor of the secondary compensation network can be integrated with the main inductive coil, which can introduce mutual couplings (e.g., three mutual couplings) in the system. The additional mutual coupling leads to a smooth power profile and an increase in power (e.g., power transferred during dynamic charging). The secondary compensation network (e.g., the secondary compensation network inductor coil) and the secondary main coil can be designed, configured, and/or arranged in a way that mutual coupling between them and the transmitter coils produces a uniform power profile.

Ensuring stable output voltage is a central focus in dynamic wireless power transfer (DWPT) technology. One approach includes mitigating voltage fluctuations by improving magnetic coil designs, developing compensation networks and introducing advanced control mechanisms to stabilize the output.

To reduce output fluctuations, another approach is to design coil structures that enhance tolerance to misalignment, thereby ensuring a stable mutual coupling profile in DWPT systems. The dimensions of the transmitter and receiver can also be optimized to minimize mutual coupling variations. Another approach can include using a dual-receiver system to minimize output voltage and power fluctuations. This setup features complementary coupling coefficients between each receiver and the transmitter, which helps reduce fluctuations as the vehicle moves across different transmitter coils. Additionally, a large receiver coil and a refined arrangement can be employed for segmented DWPT to maintain strong coupling during transitions between transmitter coils. Another design can use a transmitter track with alternately arranged segmented rectangular-solenoid pads. This configuration leverages magnetic field complementation to effectively reduce fluctuations in the receiver's output. Also, a DWPT coupler structure can incorporate multiple Q coils on the transmitter side, which can provide a smooth mutual coupling profile with minimal fluctuation, blending the benefits of both crossed and overlapped coil designs.

Another approach to reducing output voltage fluctuations involves modifying compensation networks. A series-series-parallel (S\SP) compensation network topology can be used and can be resistant to coupling variations and can help maintain a nearly constant output voltage. Another strategy for primary compensation networks in DWPT systems can focus on achieving a stable and uniform power output. The use of an LCC compensation network, specifically engineered to handle coupling fluctuations, can help stabilize both output power and voltage. A vector-summing approach can be used with a passive LC network in neighboring primary coils to reduce output power fluctuations in DWPT systems, ensuring smooth voltage transitions at the secondary coil without requiring extra sensors. A detuned DWPT system can employ an LCC/S-S compensation method to maintain stable output power and limit power fluctuations to less than 20% across a wide coupling range. A parameter matching approach can use particle swarm optimization (PSO) to design the parameters of the LCC/S compensation topology for the DWPT system, specifically under the full resonance condition of the compensation topology.

Control strategies can be effective for maintaining stable output voltage in DWPT systems, with methods categorized into three types: primary side control; secondary side control; and dual side control. While primary side control is simple, it has limitations in regulating the EV's battery and requires wireless communication, making secondary side control a more viable option. DWPT systems face challenges due to rapid fluctuations in coupling as EVs move along transmitter coils, causing voltage and current variations. To address these issues, control systems must quickly adapt to these dynamic changes. A frequency domain composite control strategy using proportional-integral (PI) control can address output voltage fluctuations (e.g., reducing them to between 4.4% and 13%). A passivity-based PI control method can be used to improve performance in handling rapid changes in coupling coefficients. However, this approach can still result in significant current pulsations of about 60%. Rapid and extensive variations in the coupling coefficient create challenges in control system design, degrading system performance. PI-based control methods struggle with precise tracking control due to their slow response to these changes, leading to fluctuations in voltage and current. As a result, nonlinear controllers, like model predictive control (MPC), are favored for DWPT systems due to their strong ability to handle disturbances and stabilize output voltage fluctuations.

Related art compensation network topologies designed to attempt to address output voltage fluctuations in DWPT systems can be categorized into high-order LC topologies, reconfigurable topologies, and optimized compensation networks. However, the first two approaches require additional components, resulting in higher costs and increased losses. Further, the optimization approach often fails to maintain a stable output voltage, typically resulting in high fluctuation rates. To overcome these challenges, embodiments of the subject invention provide a novel LCC-CLC compensation network topology for DWPT systems, ensuring stable output voltage at various positions as the receiver moves across the transmitter coil. The inductor in the secondary compensation network (CLC) can be an inductive coil similar to the main receiver coil, placed at a greater distance to avoid or inhibit cross-coupling between the receiver coil and the compensation coil. The inductor of the CLC compensation network can be coupled with the transmitter coils, and its mutual coupling profile can be the inverse of the mutual coupling between the receiver and transmitter coils. In addition to stabilizing the output voltage, this system can increase the output voltage, thereby boosting the output power.

Embodiments of the subject invention provide novel LCC-CLC compensation networks for DWPT systems, where the inductor of the CLC compensation network is coupled with the transmitter coils and exhibits no cross-coupling with the receiver coil. Embodiments ensure a stable output voltage with minimal fluctuation when the EV is traveling over the transmitter coils. The experimental results (see the Examples) validate the effectiveness of the DWPT system in providing a stable output voltage with a fluctuation rate of +/−4% (or less). Increasing the output voltage leads to higher power, as the output voltage of the DWPT system is proportional to the sum of the mutual inductance between the receiver coil and the transmitter coils, as well as the mutual inductance between the compensation inductor coil and the transmitter coils.

Figure 4:
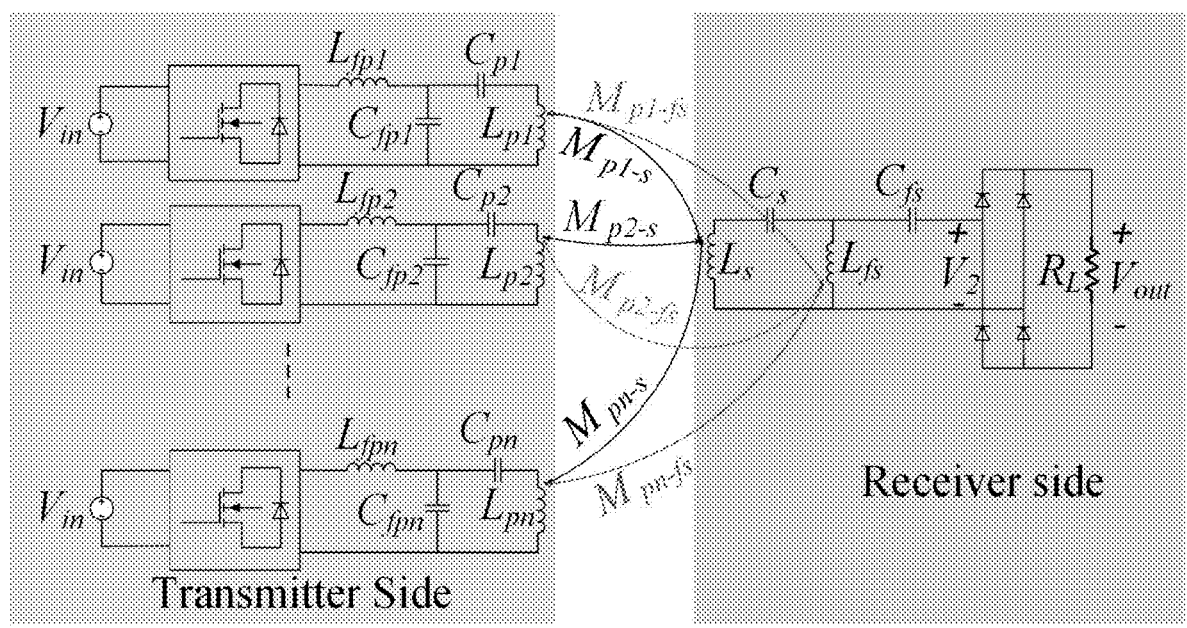
FIG. 4 shows the circuit topology of an inductor-capacitor-capacitor (LCC)-capacitor-inductor-capacitor (CLC) (LCC-CLC)-compensated DWPT system, according to an embodiment of the subject invention.

FIG. 4 shows the circuit topology of a DWPT system, according to an embodiment of the subject invention. As shown, $M_{pj-s}$ represents the mutual inductance between the j-th transmitter coil $L_{pj}$ and the receiver coil $L_s$. Additionally, $M_{pj-fs}$ denotes the mutual inductance between the j-th transmitter coil $L_{pj}$ and the inductor of the CLC compensation network at the receiver side $L_{fs}$. The inductors $L_{fp1}, \ldots, L_{fpn}$ function as resonant inductors for the transmitter coils, while the capacitors $C_{fp1}, \ldots, C_{fpn}$ serve as parallel resonant capacitors for the transmitter coils. Further, $C_{p1}, \ldots, C_{pn}$ are series resonant capacitors for the transmitter coils. The capacitors $C_{fs}$ and $C_s$ are resonant capacitors in the CLC compensation network for the receiver coil, and $L_{fs}$ is the compensation inductor for the CLC network, coupled with the transmitter coils.

Figure 5:
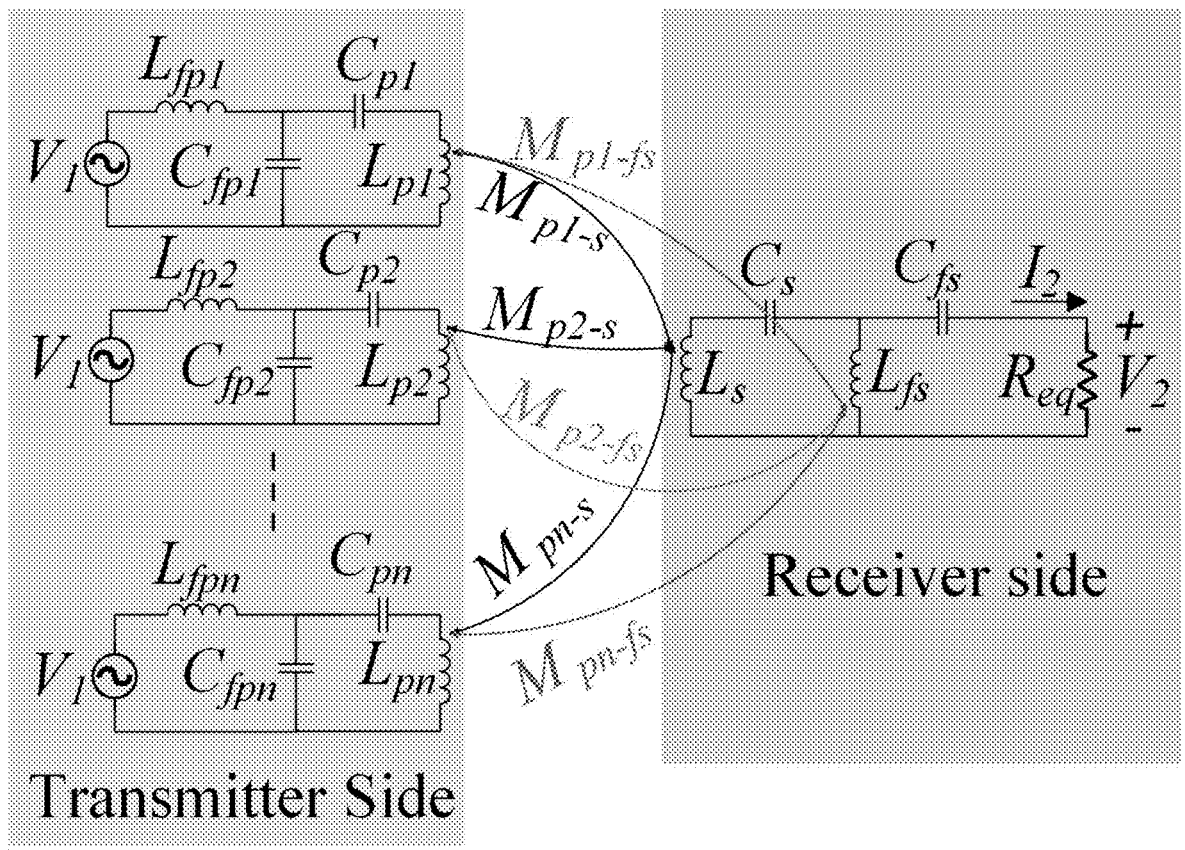
FIG. 5 shows the fundamental harmonics approximation of the LCC-CLC-compensated DWPT system of FIG. 4.

Fundamental harmonic approximation can be used to derive the output voltage of the system, and FIG. 5 shows the fundamental harmonic approximation of the DWPT system. The following equations describe the relationship of resonance between circuit parameters:

$$L_{fpi} \cdot C_{fpi} = \frac{1}{\omega^2} \qquad (1)$$

$$L_{fs} \cdot C_{fs} = \frac{1}{\omega^2}$$

$$L_{pi} - L_{fpi} = \frac{1}{\omega^2 C_{pi}}$$

-continued
$$L_2 + L_{fs} = \frac{1}{\omega^2 C_s}$$

where i refers to the i-th transmitter coil, and the following relationship holds:

$$L_{fp1} = L_{fp2} = \ldots = L_{fpn} = L_{fp} \quad (2)$$

$$C_{fp1} = C_{fp2} = \ldots = C_{fpn} = C_{fp}$$

$$C_{p1} = C_{p2} = \ldots = C_{pn} = C_p$$

The currents flowing in the transmitter coils are derived as follows:

$$I_{Lp1} = -j\omega C_{fp1} V_1 \quad (3)$$

$$\vdots$$

$$I_{Lpn} = -j\omega C_{fpn} V_1$$

where $$V_1 = \frac{2\sqrt{2}}{\pi} V_{in}.$$

Based on Equations (2) and (3), the following equations can be derived:

$$I_{Lp1} = \ldots = I_{Lpn} = I_{Lp} = -j\omega C_{fp} V_1 \quad (4)$$

The output current can be derived as follows:

$$I_2 = \left( \frac{\sum_{i=1}^{n} M_{pi-s} + \sum_{i=1}^{n} M_{pi-fs}}{L_{fs}} \right) I_{LP} \quad (5)$$

By defining $$M = \sum_{i=1}^{n} M_{pi-s} \text{ and } M_f = \sum_{i=1}^{n} M_{pi-fs},$$

where n represents the number of transmitter coils, Equation (5) can be rewritten as follows:

$$I_2 = \left( \frac{M + M_f}{L_{fs}} \right) I_{LP} \quad (6)$$

Based on Equations (6), (3), (1) and $V_2 = R_{eq} I_2$, the output voltage can be derived as follows:

$$V_2 = \left( \frac{M + M_f}{\omega L_{fs} L_{fp}} \right) R_{eq} V_1 \quad (7)$$

where $R_{eq} = (8 R_L)/\pi^2$.

Figure 6:
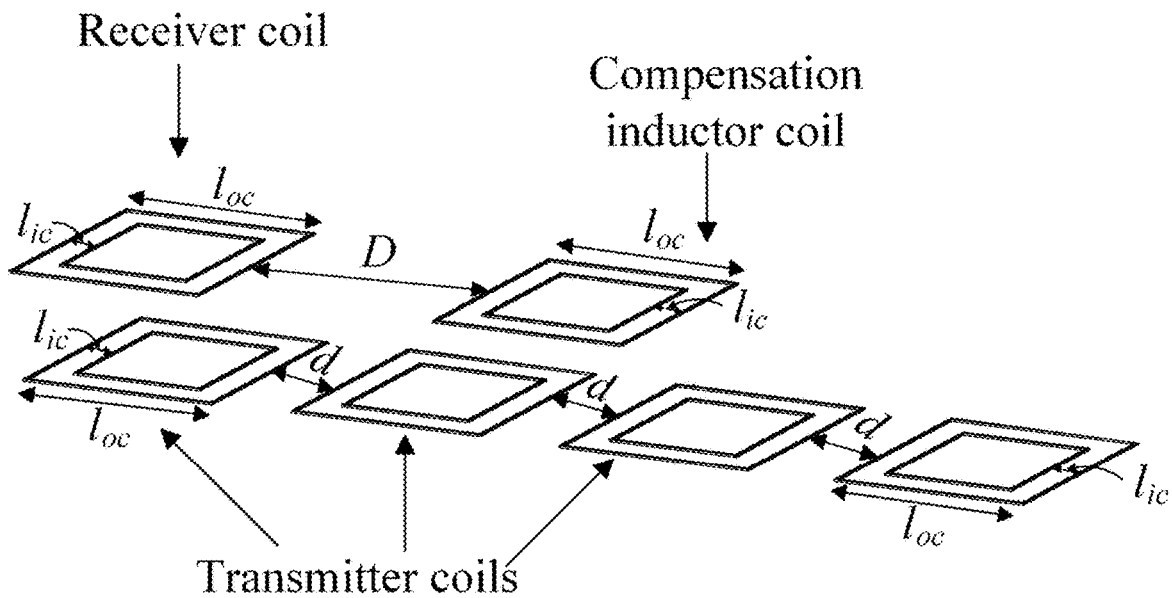
FIG. 6 shows the structure of couplers in the DWPT system of FIG. 4.

FIG. 6 shows the structure of the transmitter coils, receiver coil, and compensation coil inductor ($L_{fs}$). It should be noted that the chassis of the electric vehicle is sufficiently large to accommodate both the receiver and compensation inductor coils.

Figure 7:
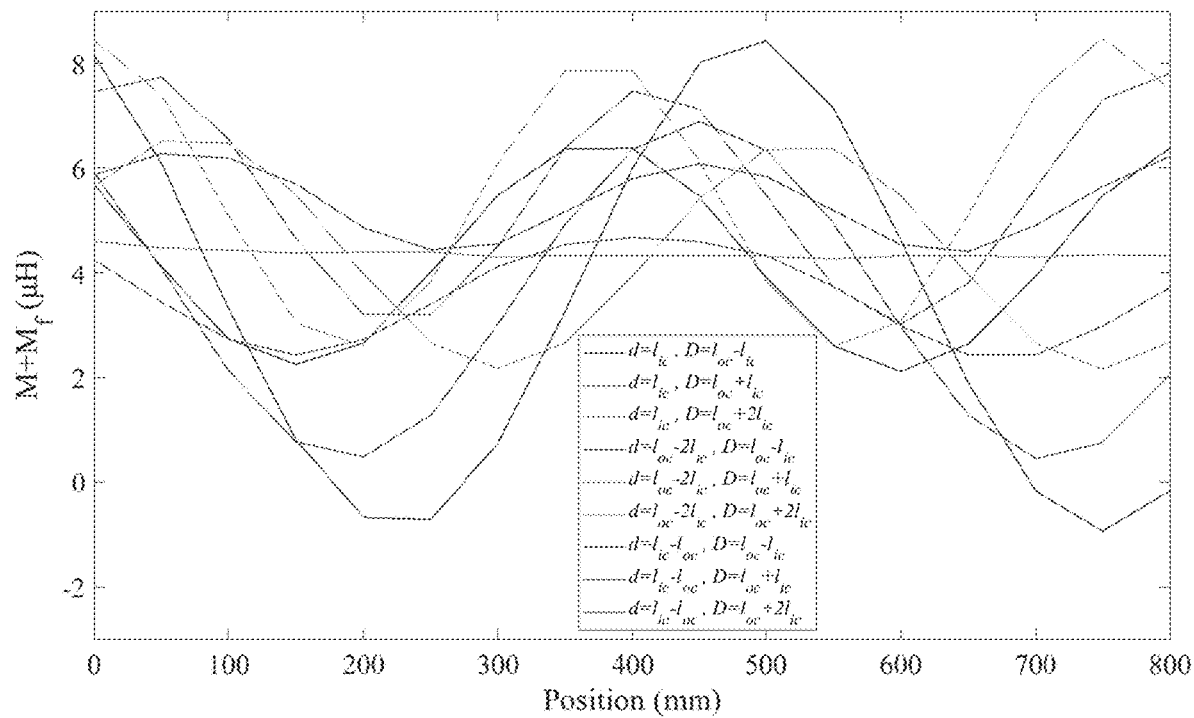
FIG. 7 shows a plot of the summation of the mutual inductances of M and $M_f$ (in microhenries (µH)) versus receiver position (in millimeters (mm)) at various distances between adjacent transmitter coils (d) and various distances between the receiver coil and the compensation inductor coil (D). The curve with the lowest $M+M_f$ value at a position of 200 mm is for $d=l_{ic}-l_{oc}$ and $D=l_{oc}-l_{ic}$; the curve with the second-lowest $M+M_f$ value at a position of 200 mm is for $d=l_{ic}-l_{oc}$ and $D=l_{oc}+l_{ic}$; the curve with the second-lowest $M+M_f$ value at a position of 300 mm is for $d=l_{oc}-2l_{ic}$ and $D=l_{oc}+2l_{ic}$; the curve with the lowest $M+M_f$ value at a position of 50 mm is for $d=l_{ic}$ and $D=l_{oc}+l_{ic}$; the curve with the second-lowest $M+M_f$ value at a position of 50 mm is for $d=l_{oc}-2l_{ic}$ and $D=l_{oc}+l_{ic}$; the curve with the second-highest $M+M_f$ value at a position of 300 mm is for $d=l_{oc}-2l_{ic}$ and $D=l_{oc}-l_{ic}$; the curve with the highest $M+M_f$ value at a position of 300 mm is for $d=l_{ic}$ and $D=l_{oc}+2l_{ic}$; the curve with the fourth-highest $M+M_f$ value at a position of 200 mm is for $d=l_{ic}-l_{oc}$ and $D=l_{oc}+2l_{ic}$; the curve with the highest $M+M_f$ value at a position of 200 mm is for $d=l_{ic}$ and $D=l_{oc}-l_{ic}$.

The output voltage profile depends on the parameters M and $M_f$, which are primarily influenced by the dimensions of the coils and the distances between adjacent transmitter coils (d) and the distance between the receiver coil and compensation inductor coil (D). Thus, the dimensions of the coils are determined first, and based on these dimensions, the optimal parameters for the distances between the coils can be found to provide a stable $M+M_f$ profile with minimal variation. FIG. 7 shows the summation of the mutual inductances of M and $M_f$ at various distances between adjacent transmitter coils (d) and various distances between the receiver coil and the compensation inductor coil (D) at different receiver positions.

Figure 8:
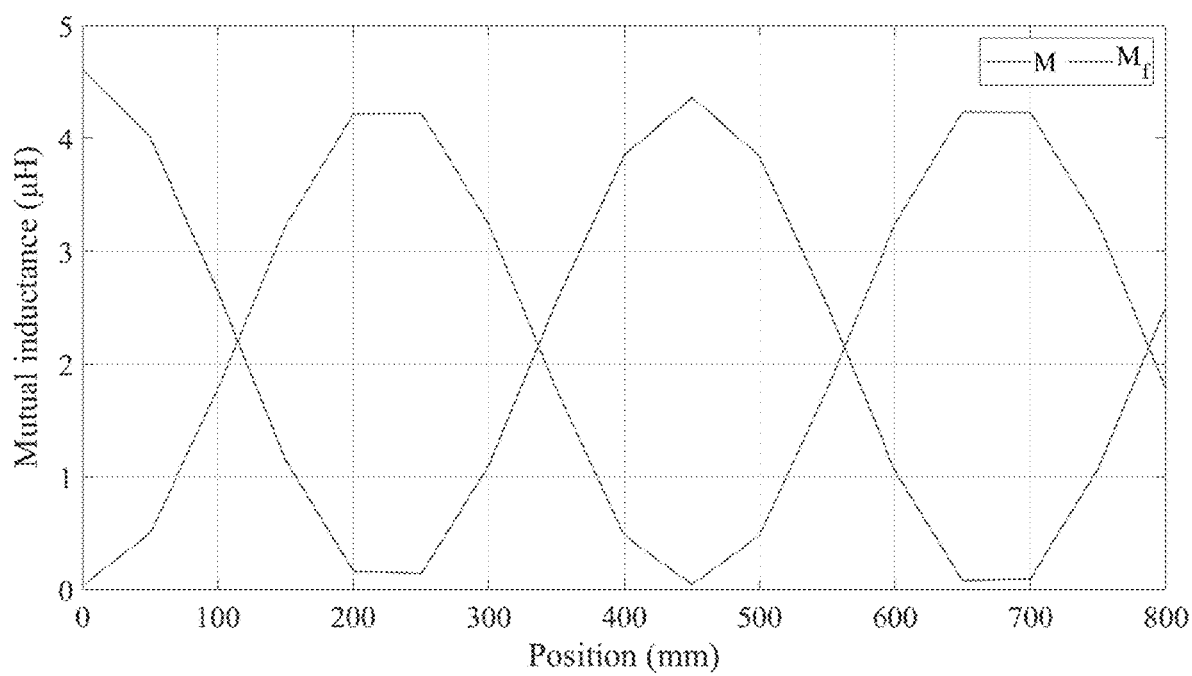
FIG. 8 shows a plot of mutual inductance (in µH) versus receiver position (in mm) when $d=l_{oc}-2l_{ic}$ and $D=l_{oc}+l_{ic}$. The curve with the highest mutual inductance value at a position of 200 mm is for $M_f$; and the curve with the lowest mutual inductance value at a position of 200 mm is for M.

In FIG. 7, $l_{oc}$ and $l_{ic}$ denote the outer and inner lengths of the transmitter coils, respectively. For example, $l_{oc}$ and $l_{ic}$ can be set to be 300 millimeters (mm) and 75 mm, respectively. Per Equation (7), the output voltage of the DWPT system is proportional to the summation of the mutual inductances of M and $M_f$, and as shown in FIG. 7, $M+M_f$ remains stable with minimal fluctuation when $d=l_{oc}-2l_{ic}$ and $D=l_{oc}+l_{ic}$. FIG. 8 shows the mutual inductance profile of M and $M_f$ when $d=l_{oc}-2l_{ic}$ and $D=l_{oc}+l_{ic}$. As shown in FIG. 8, the mutual inductance profiles of M and $M_f$ are inverses of each other, providing a stable output voltage. In other words, the mutual inductance of $M_f$ reaches its maximum when the mutual inductance of M reaches its minimum, and vice versa. In this way, the summation of these two mutual inductances is stable with minimal variations.

Figure 10:
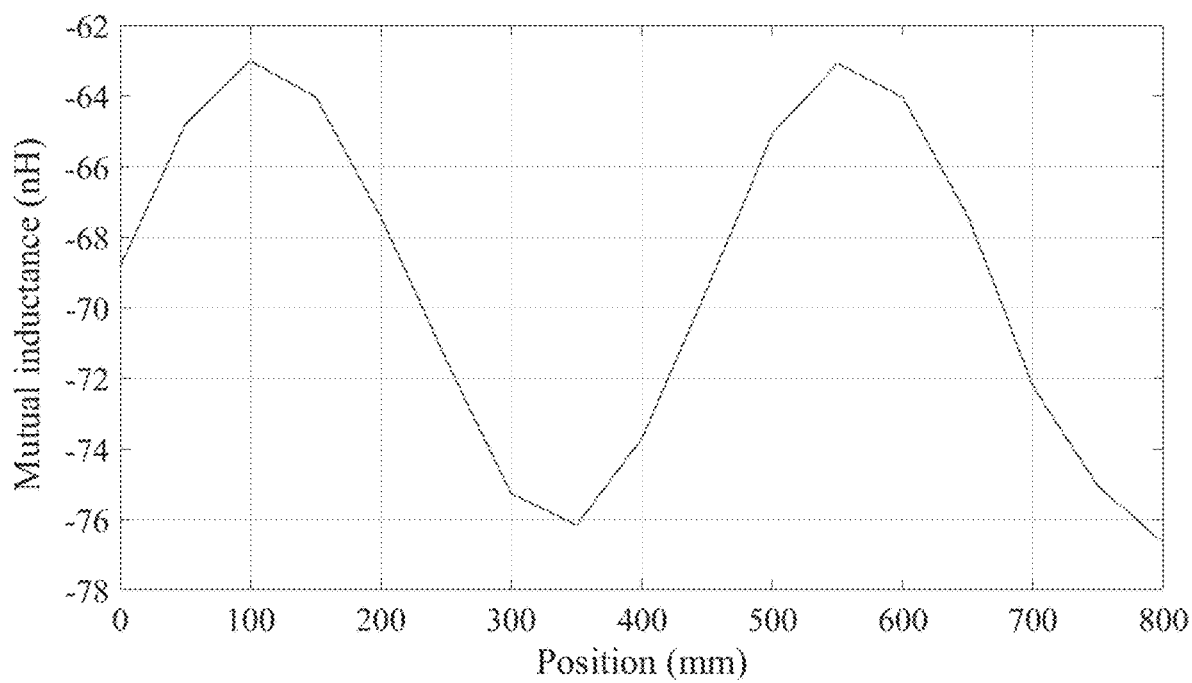
FIG. 10 shows a plot of mutual inductance (in nanohenries (nH)) between a receiver coil and a compensation inductor coil versus receiver position (in mm).
Figure 11:
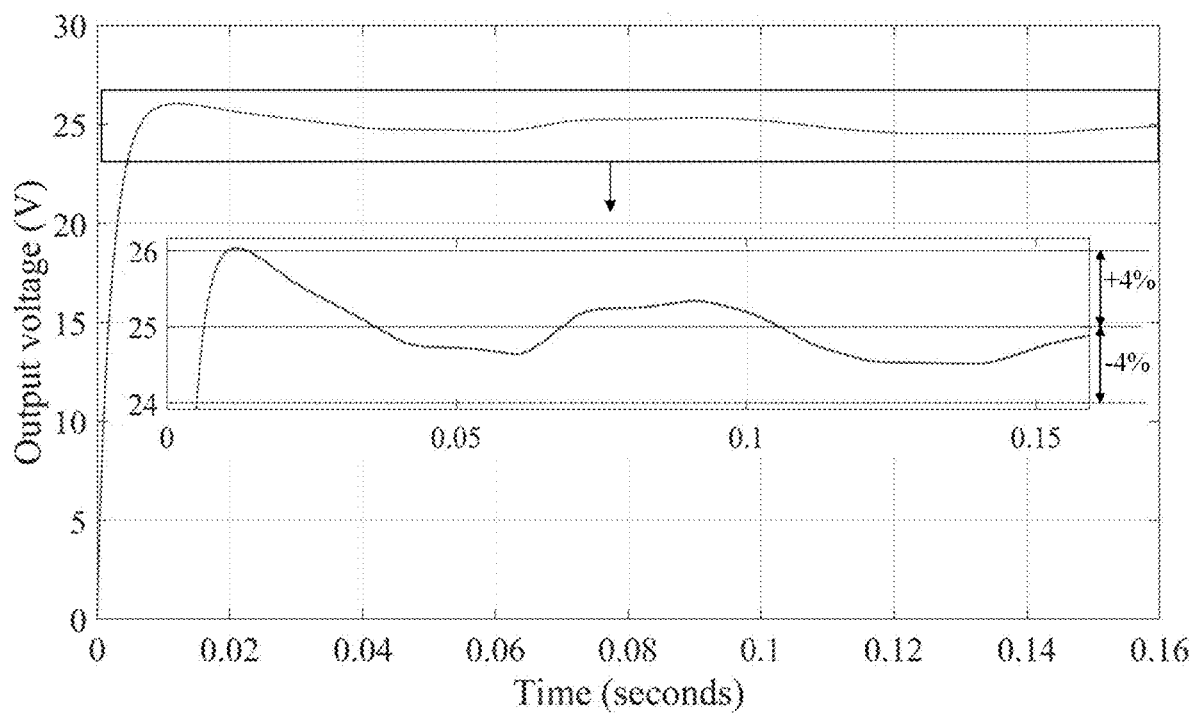
FIG. 11 shows a plot of output voltage (in V) versus time (in seconds) for a DWPT system as an EV travels at a speed of 18 km/h over the transmitter coils of the DWPT system.

FIG. 10 shows the mutual inductance between the receiver coil and the compensation inductor, which is negligible and can be neglected. FIG. 11 shows the output voltage of the DWPT system as the EV travels at a speed of 18 kilometers per hour (km/h) over the transmitter coils. It can be seen that the output voltage remains stable, with minimal fluctuation limited to +/−4%.

The table in FIG. 15 presents dimensions of the coils, along with the distances between each coil, in a DWPT system. The table in FIG. 16 outlines circuit parameters of the DWPT system.

Figure 12:
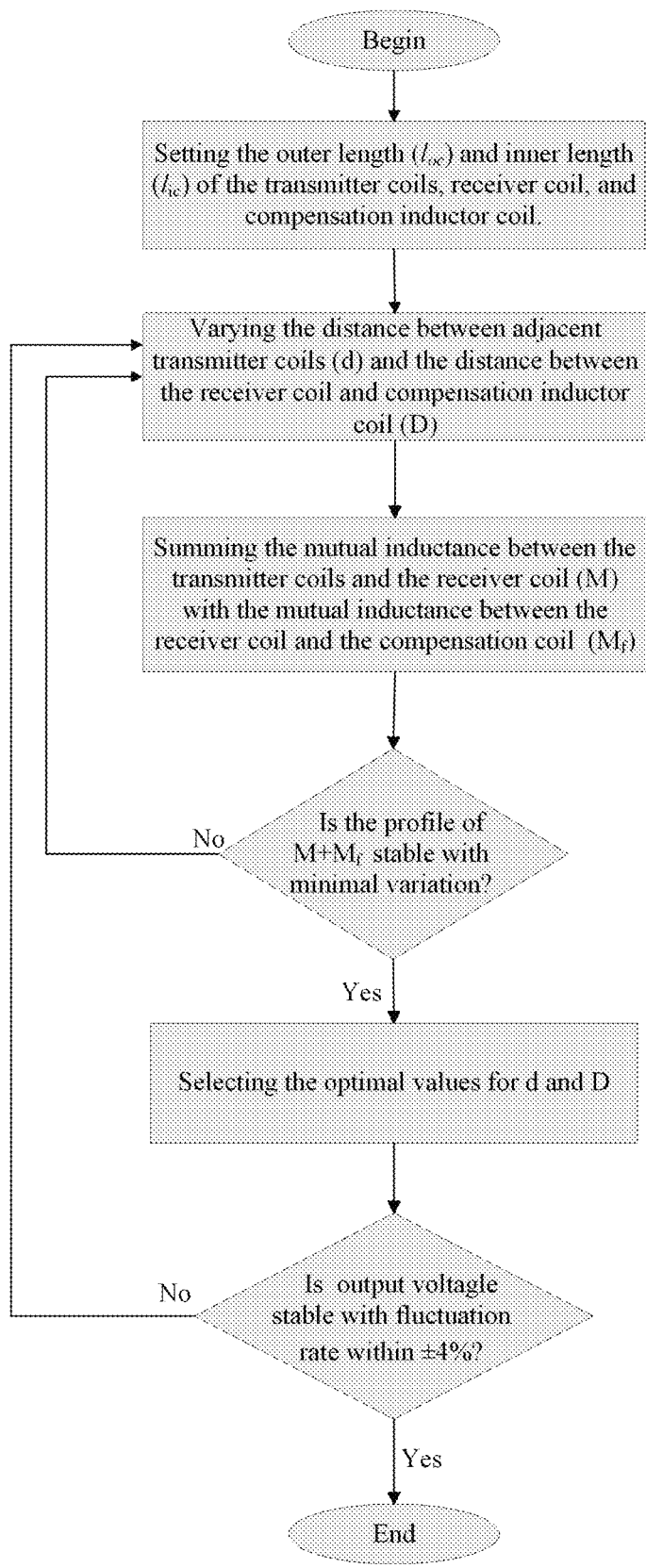
FIG. 12 shows a flow chart diagram of a design process of a DWPT system, according to an embodiment of the subject invention.
Figure 13A:
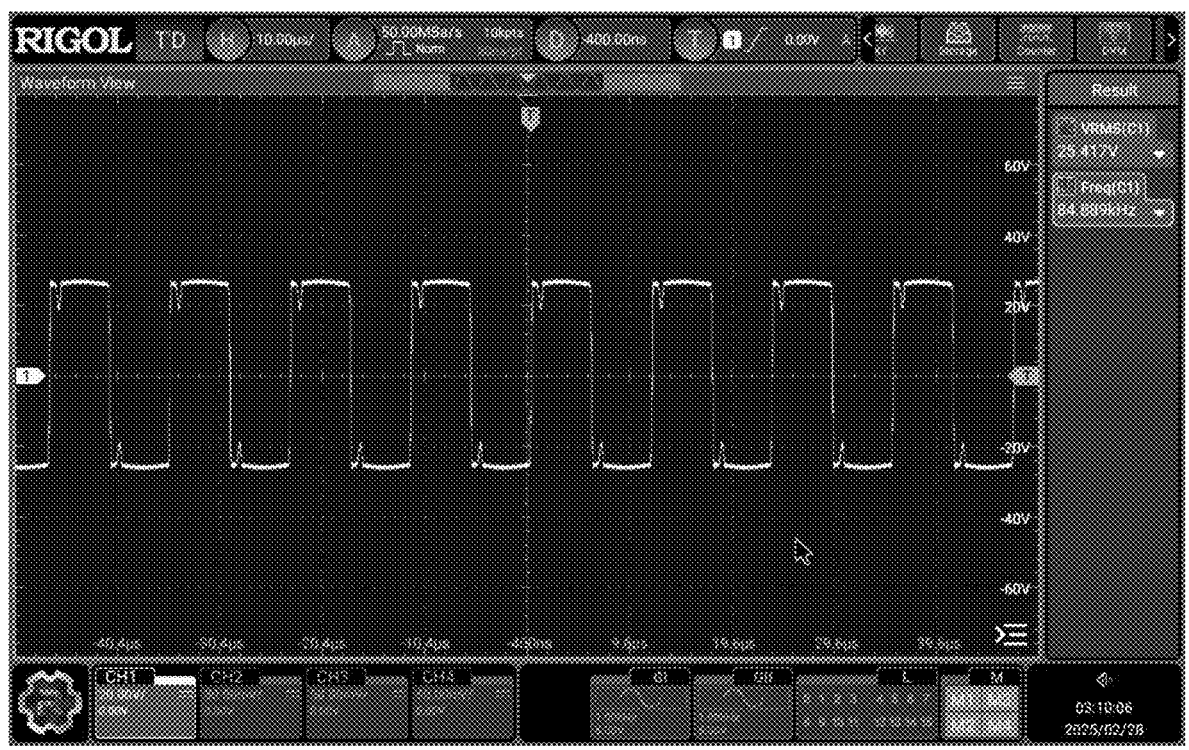
FIGS. 13A-13E show plots of output voltage (in V) versus time, showing output voltage of a DWPT system at different receiver positions.
Figure 13B:
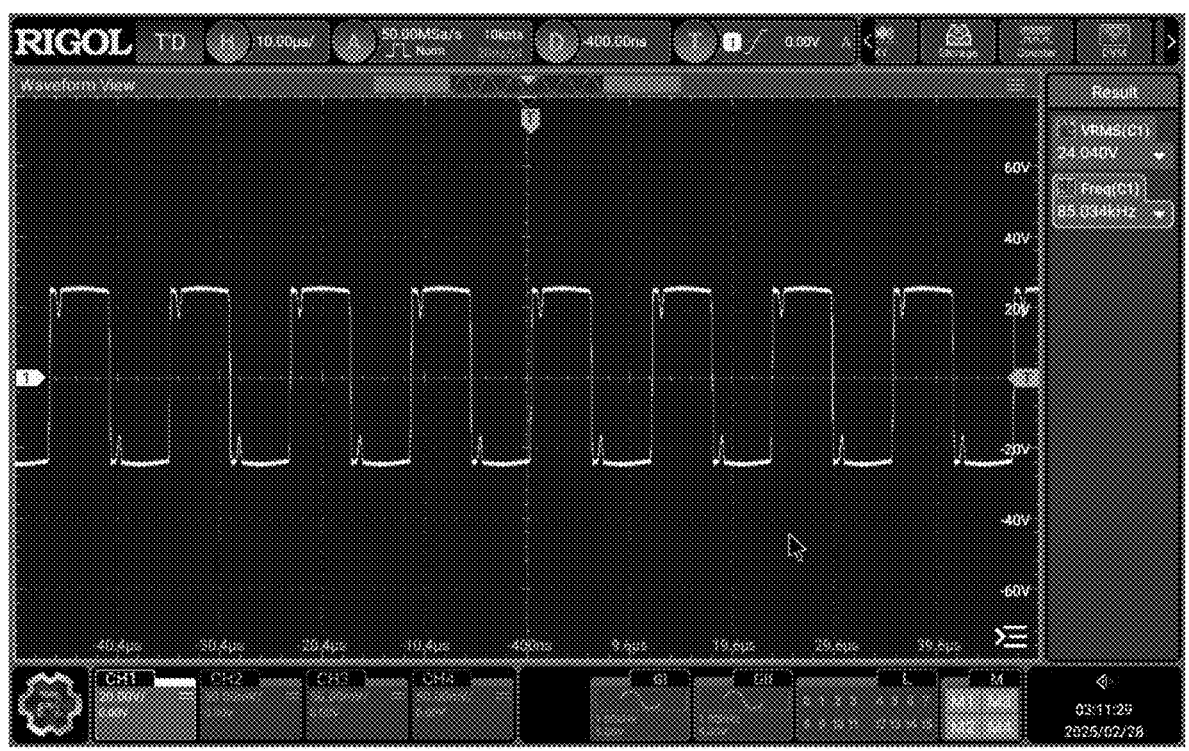
Figure 13C:
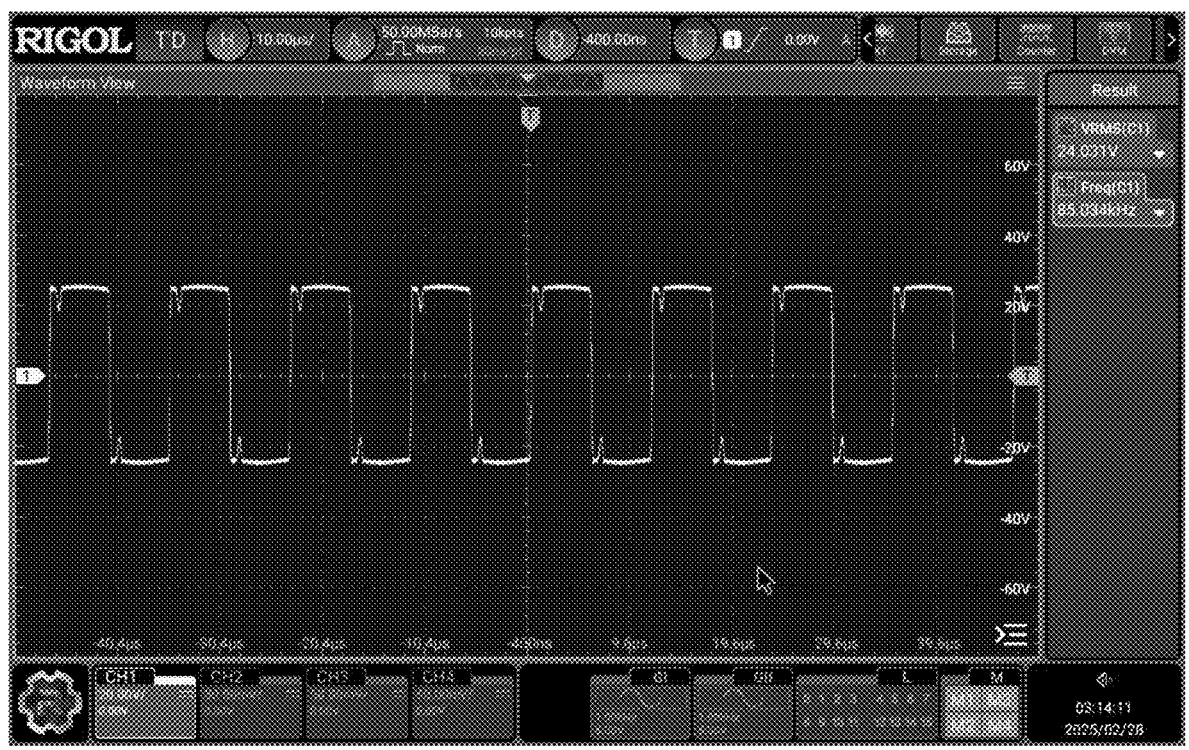
Figure 13D:
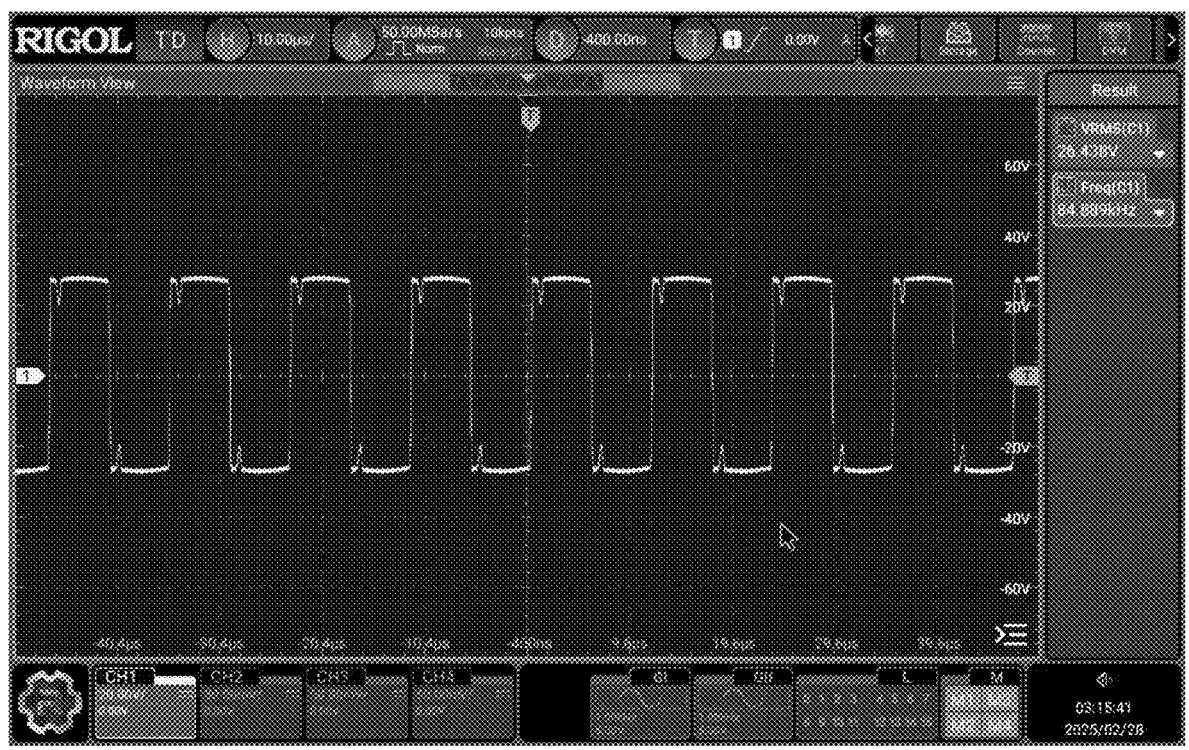
Figure 13E:
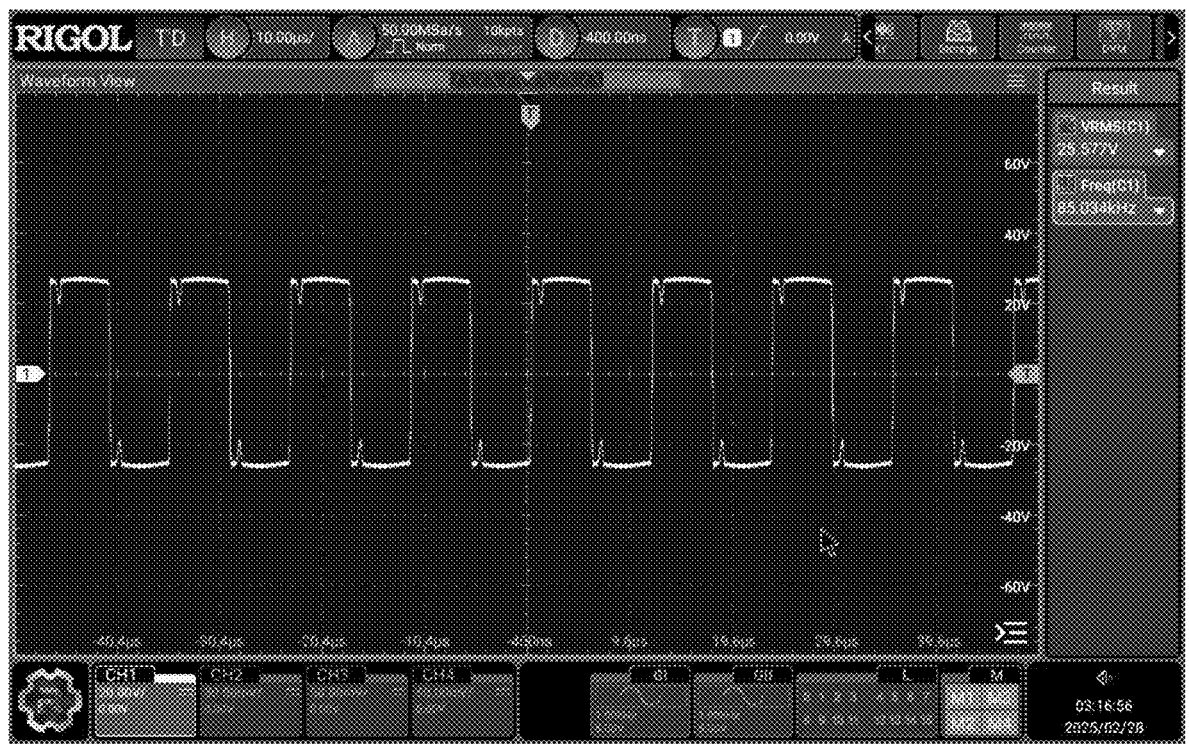

FIG. 12 shows a flowchart of the design process for a DWPT system, according to an embodiment of the subject invention. Referring to FIG. 12, the design begins by setting the outer length ($l_{oc}$) and inner length ($l_{ic}$) of the transmitter coils, receiver coil, and compensation inductor coil, as all have the same structure and dimensions. The goal is to find the optimal placement of the transmitter coils relative to each other and the optimal placement of the compensation inductor coil relative to the receiver coil, while considering the space limitations of the EV's chassis. Because the output voltage of the DWPT system is proportional to the summation of M and $M_f$, this summation can be used as a criterion for selecting optimal values for d and D. The DWPT system should meet the objective of providing a stable voltage with a fluctuation rate of +/−4% or less.

Figure 2:
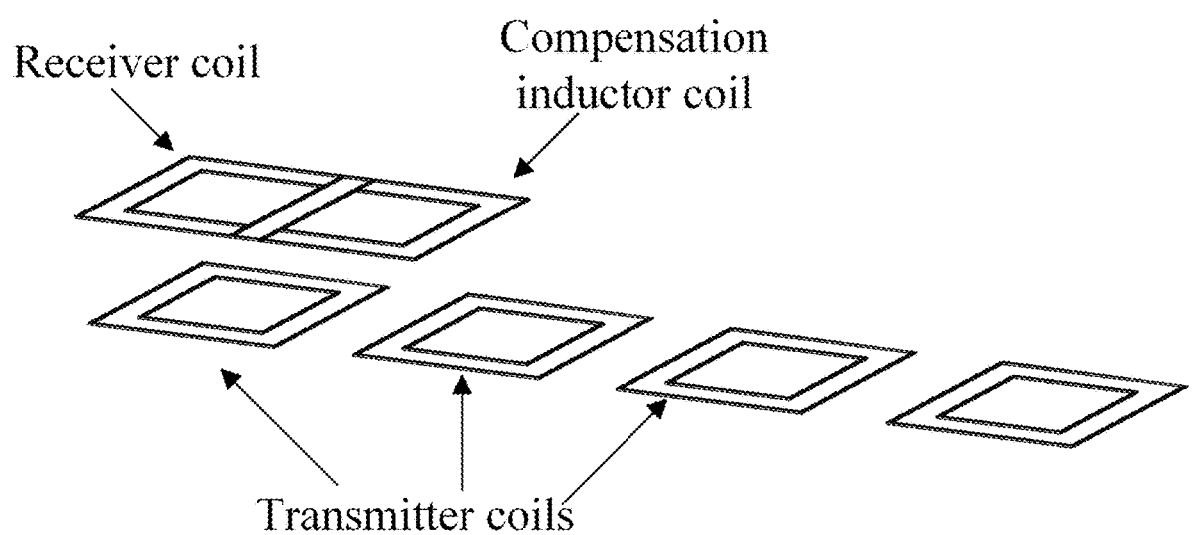
FIG. 2 shows the structure of transmitter coils, a receiver coil, and a compensation inductor in a DWPT system, according to an embodiment of the subject invention.

FIG. 1 shows the circuit topology of a DWPT system, according to an embodiment of the subject invention. As shown in FIG. 1, an inverter can be used at the input side to generate high-frequency current for the coil. An LCC compensation network can be used to reduce the reactive power and enhance efficiency at the primary side, which can be connected between the inverter and the transmitter coils. Each transmitter coil can have its own compensation network. Multiple transmitter coils can be deployed to form the track for the dynamic charging. At the secondary side (vehicle side), a receiver coil and another coil as the secondary compensation inductor can be integrated, which can introduce coupling between them and with the transmitter coils. These additional couplings can provide smooth power and increase the power, as shown in Equation (8). A rectifier can be used to convert alternating current (AC) to direct current (DC) to supply the battery. FIG. 2 shows an example of the structure and arrangement of the transmitter coils, receiver coil, and secondary compensation coil.

$$P_{out} = \frac{\sum_{i=1}^{n} M_{pi-2} \sum_{i=1}^{n} M_{pi-f2}}{\omega L_{f1}(L_{f2} + M_{2-f2})} \quad (8)$$

Embodiments of the subject invention provide novel LCC-CLC compensation network topologies to result in stable output voltage with minimal fluctuation in DWPT systems. The secondary-side compensation inductor is a coil that is identical to the receiver coil, which is coupled with the transmitter coil and has negligible cross-coupling with the receiver coil. The mutual coupling profile between the compensation inductor coil and the transmitter coil can be the inverse of the mutual coupling profile between the receiver coil and transmitter coils. The output voltage of the DWPT system can be the sum of these two mutual couplings, which consequently leads to a stable output voltage. These two mutual couplings can be used as a criterion for finding the optimal values for the distance between adjacent transmitter coils and the distance between the receiver coil and the compensation inductor coil. The compensation network topology can maintain a stable output voltage with fewer components compared to related art systems and methods and does not require control or additional sensors. Moreover, the topology of embodiments of the subject invention can provide a higher output voltage due to the summation of the two mutual couplings, compared to related art compensation network topologies. The experimental results (see the Examples) demonstrate the effectiveness of the compensation network topology in providing stable voltage with a fluctuation rate of no more than +/−4% at different receiver positions.

Embodiments of the subject invention provide constant power without using additional circuitry, are cost-effective, and increase power by using the nature of the system. With respect to providing constant power without using additional circuitry, because only a coil for the secondary compensation inductor is used, no controller and no additional circuitry is required for stabilizing and increasing power. With respect to being cost-effective, because only unipolar coils are used for the transmitter coils, receiver coil, and secondary compensation inductor, the system is cost-effective due to the cost-efficiency characteristic of unipolar coils. With respect to increasing power by using the nature of the system, because the additional coupling between the receiver coil and the compensation network leads to an increase in power, the need for higher input voltage for increasing power is eliminated, which reduces the stress on power electronic components.

When ranges are used herein, combinations and subcombinations of ranges (including any value or subrange contained therein) are intended to be explicitly included. When the term "about" or "approximately" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

A greater understanding of the embodiments of the subject invention and of their many advantages may be had from the following examples, given by way of illustration.

The following examples are illustrative of some of the methods, applications, embodiments, and variants of the present invention. They are, of course, not to be considered as limiting the invention. Numerous changes and modifications can be made with respect to embodiments of the invention.

Example 1

To validate the effectiveness of a DWPT system according to an embodiment of the subject invention, a prototype was fabricated (based on FIG. 4). On the transmitter side, a single inverter, using silicon carbide metal oxide semiconductor field effect transistors (MOSFETs) (C3M0065090D) to minimize conduction losses, powered the transmitter coils. The entire transmitter track included four coils, each separated by 150 mm (or about 150 mm), with each coil connected to its own LCC compensation network. On the receiver side, the system had a receiver coil and a compensation inductor coil, which served as the inductor in the CLC compensation network and was identical to the receiver coil. The compensation inductor coil was placed 375 mm (or about 375 mm) away from the receiver coil, per the design process recommendation. The full-bridge rectifier used silicon carbide Schottky diodes (IDWD30G120C5XKSA1) and the rectifier was connected to a resistive load.

FIGS. 13A-13E show the output voltage of the DWPT system at different positions as the receiver moved across the transmitter coils. The results demonstrate that the output voltage remains within +/−4% at various positions, validating the effectiveness of the DWPT system in maintaining a stable voltage with minimal fluctuations. It should be noted that the output voltage fluctuation rate is calculated using the following formula:

$$\Delta V_{out}\% = \frac{V_{out,max} - V_{out,min}}{V_{out,avg}} * 100\% \quad (9)$$

Figure 14:
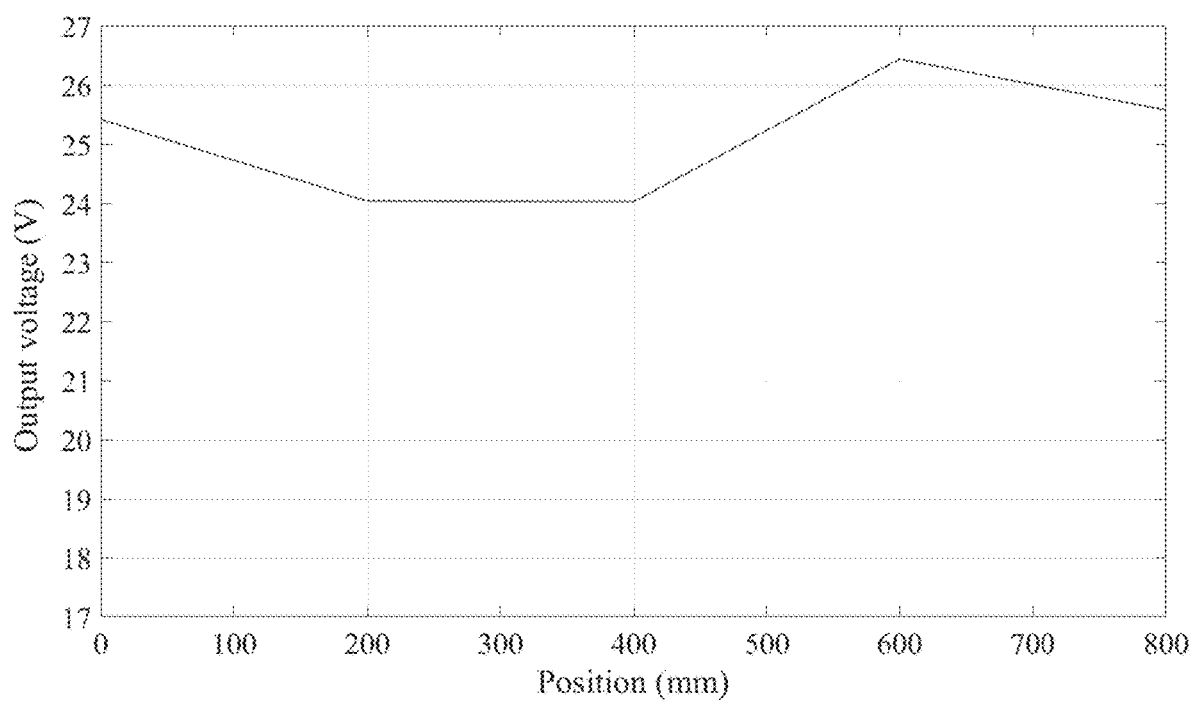
FIG. 14 shows a plot of output voltage (in V) versus position (in mm).

The reference position in the experimental setup was the distance between the left edges of the receiver coil and the first main transmitter coil, with motion occurring from left to right in the vertical direction. FIG. 14 provides a plot of the different positions and the corresponding output voltage at each position. It can be seen that the output voltage of the DWPT system was maintained within a +/−4% fluctuation rate at different receiver positions.

The table in FIG. 17 presents a comparison between the compensation network topology of embodiments of the subject invention and state-of-the-art approaches for attempting to achieve stable output voltage in DWPT systems. In Shanmugam et al. (supra.; cited in the Brief Description of the Drawings), an S-LCC/SP-compensated DWPT system was used where the secondary compensation network switched between LCC and SP topologies with the deployment of secondary-side control, resulting in a 14.3% fluctuation rate. However, this approach relies on additional control and exhibits a high fluctuation rate. An optimization method proposed by Xiong et al. (supra.; cited in the Brief Description of the Drawings) reduced power fluctuation to 8.5% by utilizing the detuning rate, but the system is only efficient when adjacent transmitter coils are very close, and the fluctuation rate remains relatively high. In Deng et al. (supra.; cited in the Brief Description of the Drawings), a vector-summing approach was used that reduced output power fluctuation by incorporating a passive LC network into neighboring primary coils, allowing the combination of induced voltage vectors without the need for extra sensors, thereby maintaining a quasi-constant induced voltage at the secondary coil for smooth power transitions. However, this approach requires more compensation network components and is more complex.

The proposed systems and methods of embodiments of the subject invention utilize an LCC-CLC compensation network, where the secondary-side resonant inductor is the same coil as the receiver coil and is coupled with the transmitter coils. This approach effectively reduces the output voltage fluctuation rate to no more than +/−4%, with fewer compensation network components than Xiong et al. (supra.) and Deng et al. (supra.). Additionally, embodiments of the subject invention do not require any extra control or sensors, offering the advantage of simplicity.

Example 2

Figure 9A:
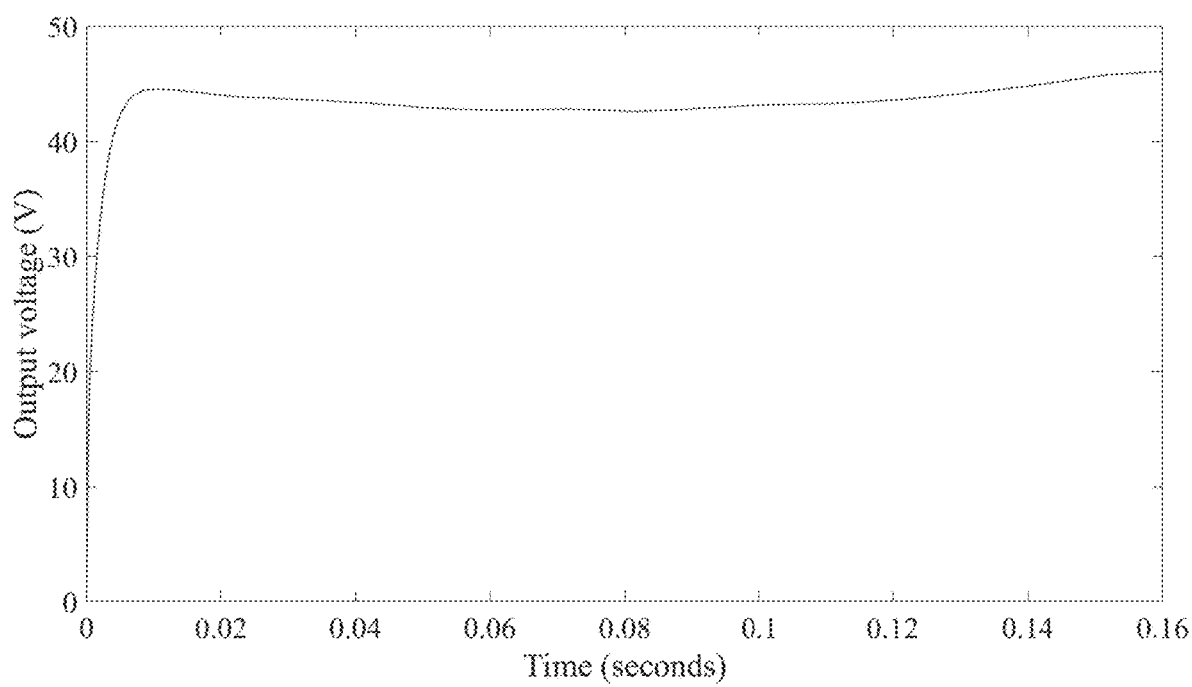
FIG. 9A shows a plot of output voltage (in Volts (V)) versus time (in seconds) for a DWPT system as an electric vehicle (EV) travels at a speed of 18 kilometers per hour (km/h) over the transmitter coils of the DWPT system.
Figure 9B:
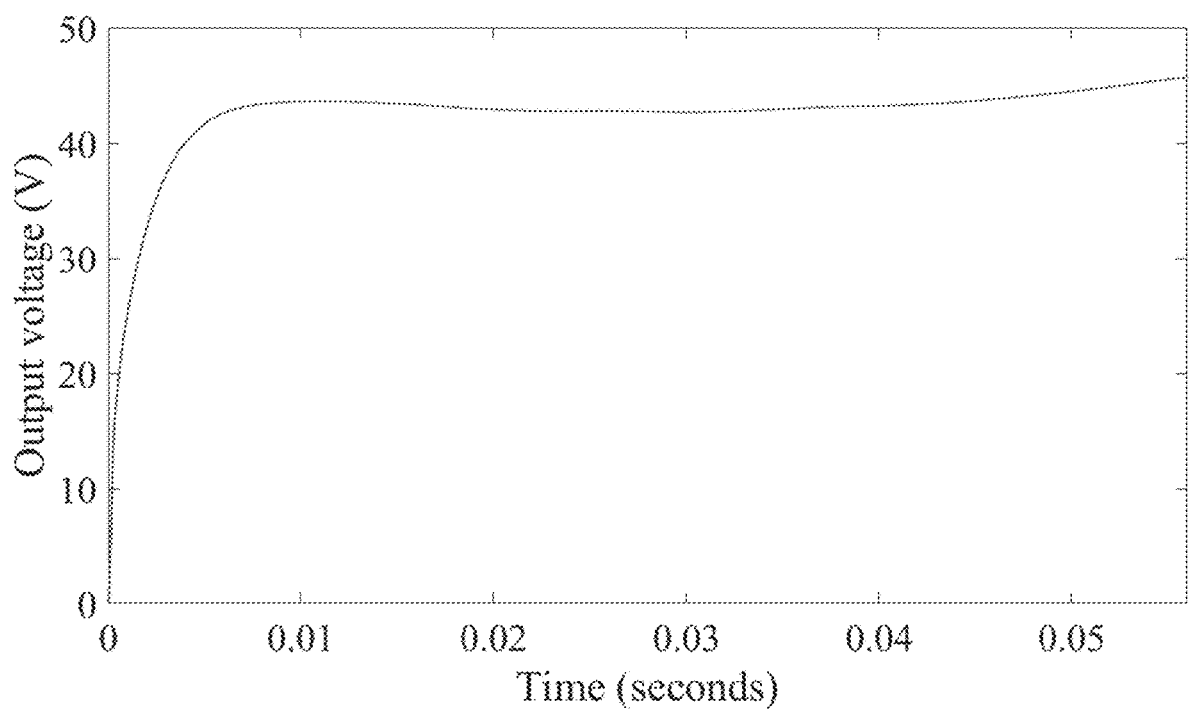
FIG. 9B shows a plot of output voltage (in V) versus time (in seconds) for a DWPT system as an EV travels at a speed of 50 km/h over the transmitter coils of the DWPT system.
Figure 9C:
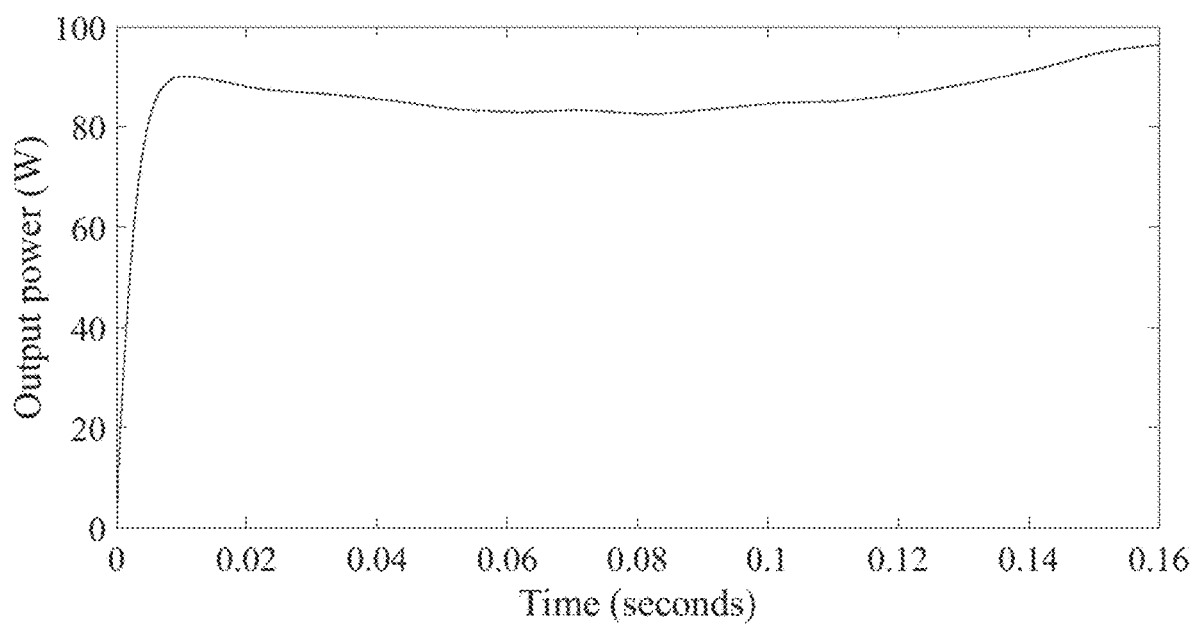
FIG. 9C shows a plot of output power (in W) versus time (in seconds) for a DWPT system as an EV travels at a speed of 18 km/h over the transmitter coils of the DWPT system.
Figure 9D:
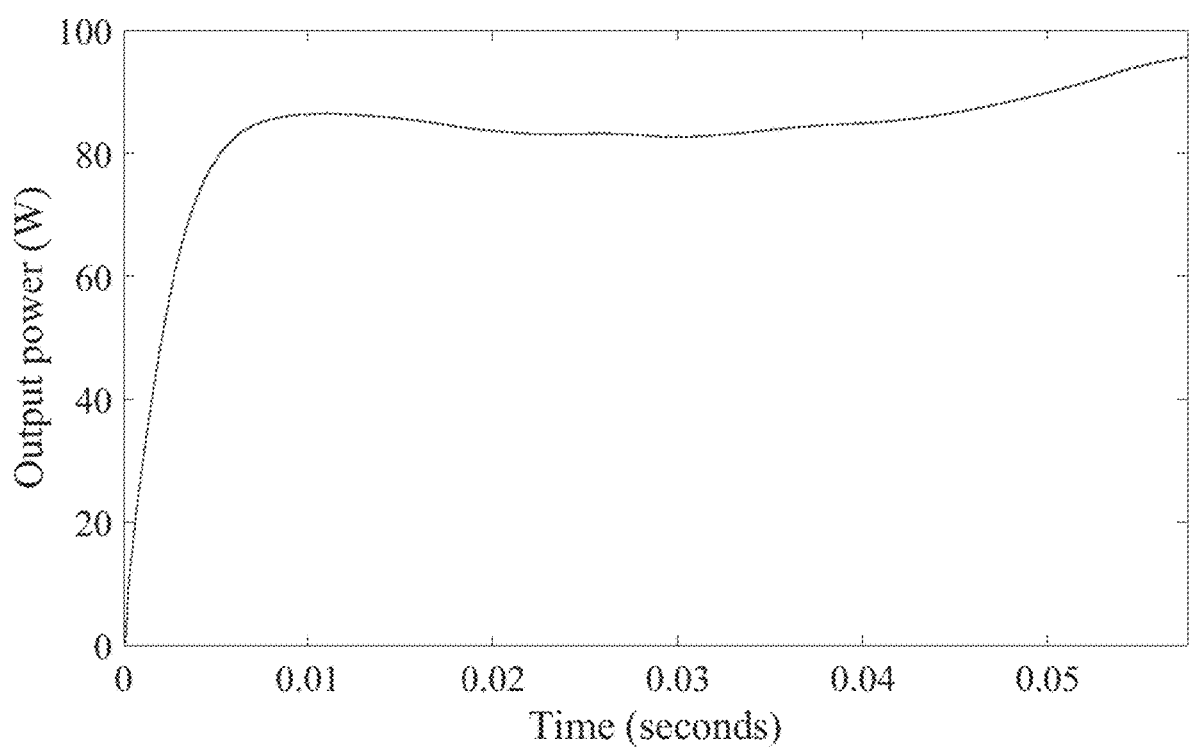
FIG. 9D shows a plot of output power (in W) versus time (in seconds) for a DWPT system as EV travels at a speed of 50 km/h over the transmitter coils of the DWPT system.

The DWPT system from Example 1 was tested with charging an EV as it traveled over the transmitter coils, first at a speed of 18 km/h and then at a speed of 50 km/h. FIGS. 9A and 9C show the output voltage and output power, respectively, of the DWPT system when the EV was traveling at 18 km/h; and FIGS. 9B and 9D show the output voltage and output power, respectively, of the DWPT system when the EV was traveling at 50 km/h. It can be seen that the output voltage and power both remained stable.

Example 3

Figure 3:
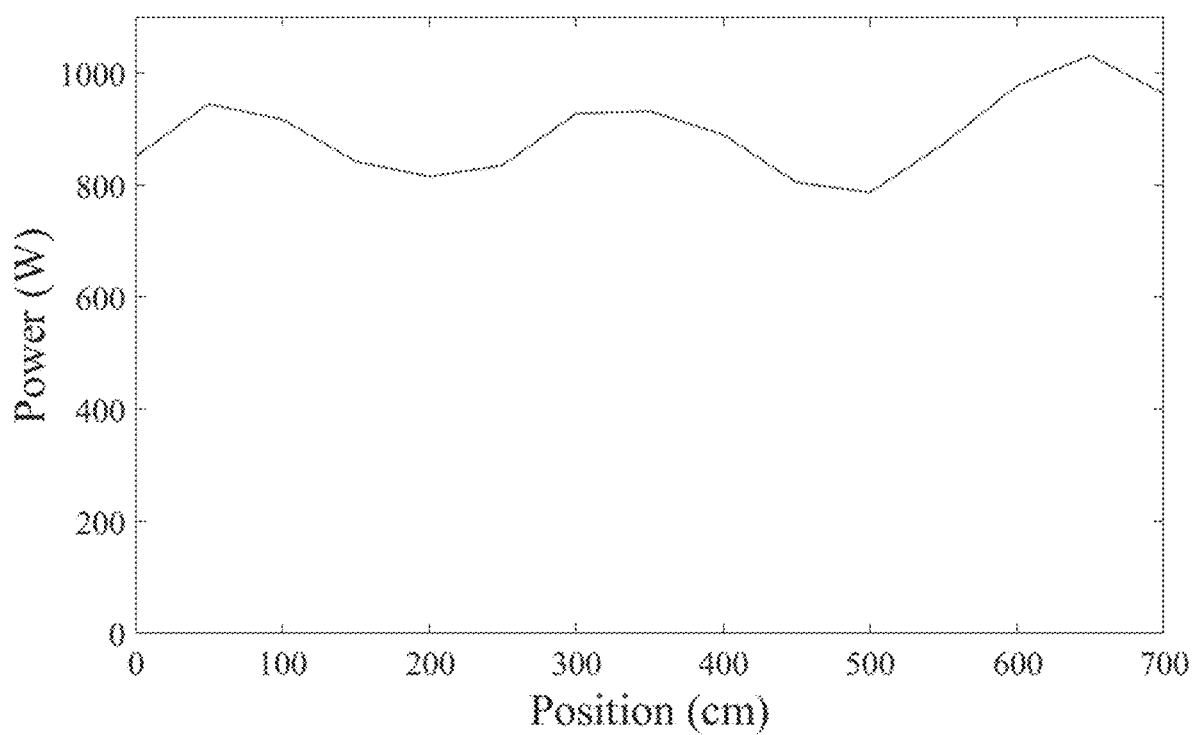
FIG. 3 shows a plot of output power (in Watts (W)) versus receiver position (in centimeters (cm)).

A DWPT system as shown in FIGS. 1 and 2 was tested. FIG. 3 shows the output power, which is fairly uniform and smooth.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A system for dynamic wireless power transfer (DWPT), the system comprising:
    a transmitter side configured to wirelessly transmit power to a receiver coil during DWPT, the transmitter side comprising a plurality of transmitter coils; and
    a receiver side configured to wirelessly receive power from the transmitter side during DWPT, the receiver side comprising the receiver coil,
    the receiver side further comprising a secondary compensation network comprising a compensation inductor integrated with the receiver coil and disposed in parallel with the receiver coil,
    the compensation inductor having a same outer length as the receiver coil and a same inner length as the receiver coil,
    the system being configured to produce an output voltage, on the receiver side during DWPT, with a fluctuation rate of +/−4% or less, while the receiver side is moved over the transmitter side such that the receiver side receives power from the transmitter side as it moves over the transmitter side,
    the compensation inductor being identical to the receiver coil, and
    each transmitter coil of the plurality of transmitter coils being identical to the receiver coil.

2. The system according to claim 1, the secondary compensation network further comprising: a first series resonant capacitor disposed in series with the receiver coil; and a second series resonant capacitor disposed in series with the first series resonant capacitor.

3. The system according to claim 1, the transmitter side further comprising: a plurality of parallel resonant capacitors disposed in parallel with the plurality of transmitter coils, respectively; and a plurality of resonant inductors disposed in series with the plurality of transmitter coils, respectively.

4. The system according to claim 1, the transmitter coils and the receiver coil having a first mutual inductance during DWPT, and
    the transmitter coils and the compensation inductor having a second mutual inductance during DWPT, and
    the system being configured such that a sum of the first mutual inductance and the second mutual inductance is stable within a predetermined stability limit during DWPT.

5. The system according to claim 1, the receiver side being disposed on an electric vehicle (EV).

6. A method for DWPT, the method comprising:
    providing the system according to claim 1; and
    moving the receiver side over the transmitter side such that the receiver side receives power from the transmitter side as it moves over the transmitter side,
    the transmitter coils and the receiver coil having a first mutual inductance during the DWPT, and
    the transmitter coils and the compensation inductor having a second mutual inductance during the DWPT.

7. The method according to claim 6, a sum of the first mutual inductance and the second mutual inductance being stable within a predetermined stability limit during the DWPT.

8. The method according to claim 6, the receiver side being disposed on an electric vehicle (EV), and
    the moving of the receiver side over the transmitter side comprising driving the EV over the transmitter side.

9. A method for designing a system for dynamic wireless power transfer (DWPT) that comprises:
    a transmitter side configured to wirelessly transmit power to a receiver coil during DWPT, the transmitter side comprising a plurality of transmitter coils; and
    a receiver side configured to wirelessly receive power from the transmitter side during DWPT, the receiver side comprising the receiver coil and a secondary compensation network that comprises a compensation inductor integrated with the receiver coil and disposed in parallel with the receiver coil,
    the compensation inductor, the receiver coil, and each transmitter coil of the plurality of transmitter coils all having a same outer length as each other and a same inner length as each other,
    the method comprising the following steps, in order:
    i) setting the outer length and the inner length for the compensation inductor, the receiver coil, and each transmitter coil of the plurality of transmitter coils;
    ii) setting a first distance between adjacent transmitter coils of the plurality of transmitter coils;
    iii) setting a second distance between the receiver coil and the compensation inductor;
    iv) adding a first mutual inductance between the transmitter coils and the receiver coil to a second mutual inductance between the transmitter coils and the compensation inductor, to obtain a summed mutual inductance;

v) determining whether the summed mutual inductance is stable within a predetermined stability limit;

vi) upon determining that the summed mutual inductance is not stable within the predetermined stability limit, returning to step ii);

vii) upon determining that the summed mutual inductance is stable within the predetermined stability limit, determining whether a fluctuation rate of an output voltage of the system, on the receiver side during the DWPT, is within a predetermined fluctuation limit;

viii) upon determining that the fluctuation rate of the output voltage is not within the predetermined fluctuation limit, returning to step ii);

ix) upon determining that the fluctuation rate of the output voltage is within the predetermined fluctuation limit, determining that the first distance and the second distance are final values for the system with the set outer length and the set inner length for the compensation inductor, the receiver coil, and each transmitter coil of the plurality of transmitter coils.

10. The method according to claim 9, the predetermined fluctuation limit being +/−4%.

11. The method according to claim 9, the receiver side being disposed on an electric vehicle (EV).

12. A system for dynamic wireless power transfer (DWPT), the system comprising:
a transmitter side configured to wirelessly transmit power to a receiver coil during DWPT, the transmitter side comprising a plurality of transmitter coils; and
a receiver side configured to wirelessly receive power from the transmitter side during DWPT, the receiver side comprising the receiver coil,
the receiver side further comprising a secondary compensation network comprising a compensation inductor integrated with the receiver coil and disposed in parallel with the receiver coil,
the compensation inductor being identical to the receiver coil,
each transmitter coil of the plurality of transmitter coils being identical to the receiver coil,
the secondary compensation network further comprising: a first series resonant capacitor disposed in series with the receiver coil; and a second series resonant capacitor disposed in series with the first series resonant capacitor,
the transmitter side further comprising: a plurality of parallel resonant capacitors disposed in parallel with the plurality of transmitter coils, respectively; and a plurality of resonant inductors disposed in series with the plurality of transmitter coils, respectively,
the transmitter coils and the receiver coil having a first mutual inductance during DWPT,
the transmitter coils and the compensation inductor having a second mutual inductance during DWPT,
the system being configured such that a sum of the first mutual inductance and the second mutual inductance is stable within a predetermined stability limit during DWPT,
the receiver side being disposed on an electric vehicle (EV), and
the system being configured to produce an output voltage, on the receiver side during DWPT, with a fluctuation rate of +/−4% or less.

13. A method for DWPT, the method comprising:
providing the system according to claim 12; and
moving the receiver side over the transmitter side such that the receiver side receives power from the transmitter side as it moves over the transmitter side,
the fluctuation rate of the output voltage, on the receiver side during the DWPT, being +/−4% or less.

* * * * *